Patented Mar. 22, 1927.

1,622,001

UNITED STATES PATENT OFFICE.

HANS RUKOP, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

CIRCUIT ARRANGEMENT FOR GENERATING ELECTRICAL OSCILLATIONS.

Application filed December 27, 1922, Serial No. 609,183, and in Germany February 14, 1922.

The present invention relates to a circuit arrangement for electron discharge tubes generating oscillations, and may be used in both the auto-energizing or regenerative back-coupling method, and the outside energizing method, that is, where energy is supplied to the grid by an independent oscillator. It consists in providing a resistance of a value that is not too high in that portion of the anode circuit which is traversed by direct current, or, in other words, in the portion of the circuit next to the cathode. The grid supply circuit is behind this resistance, thereby causing the anode direct current to generate a proportional negative grid potential. The circuit arrangement will be clearly understood by referring to the drawing.

Fig. 1 is a diagrammatic representation of a circuit arrangement embodying the invention, and Fig. 2 is a diagrammatic representation of a circuit arrangement similar to Fig. 1, but comprising a tube the resistance of which may be varied by imposing a speech potential upon it.

The resistance W may be used in high frequency telephony if, for example, a common arrangement (not shown) is used in which the anode potential is varied in accordance with the measure of the speech. In view of the fact that the anode direct current varies in proportion with the operating potential, the resistance will produce a grid potential which is opposite to but in proportion with the variation in the anode potential. This grid potential may be used to good advantage for insuring the continuation of the oscillations. For the purpose of permitting the passage of high frequency currents, the resistance W is bridged by a suitable condenser $C_1$ and the necessarily fixed grid potential $Eg$ is connected in series. Anode potential is supplied by the generator $Ea$ operating thru choke coil L which is provided to prevent the flow of high frequency currents thru the anode circuit.

The resistance W may be useful also in case of constant anode potential. It works like the well known resistance in the grid circuit which generates a negative grid potential under the control of the grid current. As pointed out above the arrangement may be used as a straight amplifier, the input being fed into the grid circuit and the output being taken out of the plate circuit. The manner of accomplishing this is old and well-known.

Also the arrangement may be used as an oscillation generator. In this case the grid circuit must be coupled to the plate circuit so that sufficient energy is fed back from the plate circuit to the grid circuit to produce sustained oscillations. This coupling may be done in any of the well known ways, either by coils in the plate and grid circuits suitably located and coupled together, or thru the capacity of the tube itself. The frequency of the generated oscillations will, of course, be determined by the various constants of the arrangement.

Finally as shown in Fig. 2, the resistance itself may be variable. For example, it may be in the form of a modulated tube P. It may serve to cooperate with an anode potential variation operating in the same measure, and it may be variable in itself to control the grid by speech, key sending, regulating, etc. As illustrated, the grid circuit of the three element thermionic tube P is controlled by voice potential caused by telephone transmitter T acting thru transformer A. Direct current is supplied the transmitter T by battery D.

Having described my invention, what I claim is:

1. In an alternating current system, a three-electrode tube provided with an anode circuit, a source of energy in the anode circuit, a resistance in the anode circuit between the cathode and the source of energy, a grid circuit connected with the anode circuit between the resistance and the source of energy, so as to give the grid a negative bias, a condenser connected in parallel with the resistance for passing high frequency currents, and a source of potential in the grid circuit between the resistance and the condenser.

2. In an alternating current system, a three-electrode tube having an anode circuit, a source of energy in the anode circuit, a modulator tube in the anode circuit between the cathode and the source of energy, and acting as a variable resistance in the anode circuit, and the grid circuit of said first tube connected with the anode circuit between the modulator tube and the source of energy.

3. In an alternating current system, a three-electrode tube having an anode circuit, a source of energy in the anode circuit, modulator tube in the anode circuit between the cathode and the source of energy and acting as a variable resistance in the anode circuit, and the grid circuit of said first tube connected with the anode circuit between the modulator tube and the source of energy, and means for impressing a signal to be transmitted on said modulator tube.

HANS RUKOP.